(12) United States Patent
Yagi et al.

(10) Patent No.: US 8,338,495 B2
(45) Date of Patent: Dec. 25, 2012

(54) METHOD FOR EFFICIENT USE OF HEAT FROM TUBULAR REFORMER

(75) Inventors: Fuyuki Yagi, Yokohama (JP); Kenichi Kawazuishi, Yokohama (JP)

(73) Assignees: Japan Oil, Gas and Metals National Corporation, Kawasaki-shi, Kanagawa (JP); Inpex Corporation, Tokyo (JP); Nippon Oil Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP); Chiyoda Corporation, Yokohama-shi, Kanagawa (JP)

( * ) Notice: Subject to any disclaimer, the term of this patent is extended or adjusted under 35 U.S.C. 154(b) by 363 days.

(21) Appl. No.: 12/677,623

(22) PCT Filed: Sep. 18, 2008

(86) PCT No.: PCT/JP2008/067370
§ 371 (c)(1),
(2), (4) Date: Mar. 11, 2010

(87) PCT Pub. No.: WO2009/041545
PCT Pub. Date: Apr. 2, 2009

(65) Prior Publication Data
US 2010/0197814 A1      Aug. 5, 2010

(30) Foreign Application Priority Data

Sep. 28, 2007 (JP) .................................. 2007-254856

(51) Int. Cl.
*C07C 27/00* (2006.01)
*C10G 45/00* (2006.01)
*C10G 7/00* (2006.01)

(52) U.S. Cl. .......... 518/700; 518/702; 518/704; 208/89; 208/92

(58) Field of Classification Search ............... 518/700, 518/702, 704; 208/89, 92
See application file for complete search history.

(56) References Cited

U.S. PATENT DOCUMENTS
7,060,118 B1    6/2006 Dybkjaer et al.
(Continued)

FOREIGN PATENT DOCUMENTS
JP    2001-342003 A    12/2001
(Continued)

OTHER PUBLICATIONS
International Search Report of PCT/JP2008/067370, mailing date of Dec. 16, 2008.
(Continued)

*Primary Examiner* — Jafar Parsa
(74) *Attorney, Agent, or Firm* — Westerman, Hattori, Daniels & Adrian, LLP

(57) ABSTRACT

In a GTL process of producing various kinds of hydrocarbon oils from natural gas, provided is improved heat efficiency in the case of using a steam reforming process or a carbon dioxide reforming process in the reforming. The process includes producing a synthesis gas by converting the natural gas and at least one of steam and carbon dioxide into a synthesis gas through a tubular reformer filled with a reforming catalyst, producing Fischer-Tropsch oil by subjecting the produced synthesis gas to a Fischer-Tropsch reaction, and upgrading in which the Fischer-Tropsch oil is subjected to hydrotreatment and distillation to produce various kinds of hydrocarbon oils, in which excess heat generated in the synthesis gas production is recovered, and the recovered heat is used as heat for at least one of hydrotreatment and distillation in the upgrading.

2 Claims, 4 Drawing Sheets

U.S. PATENT DOCUMENTS

| | | | |
|---|---|---|---|
| 2002/0004533 | A1 | 1/2002 | Wallace et al. |
| 2002/0016375 | A1 | 2/2002 | Iijima et al. |
| 2003/0022948 | A1* | 1/2003 | Seiki et al. .................... 518/704 |
| 2003/0119924 | A1 | 6/2003 | Moore et al. |
| 2005/0220703 | A1 | 10/2005 | Ihara et al. |

FOREIGN PATENT DOCUMENTS

| | | |
|---|---|---|
| JP | 2002-521295 A | 7/2002 |
| JP | 2003-521576 A | 7/2003 |
| JP | 2005-514474 A | 5/2005 |
| JP | 2005-193110 A | 7/2005 |
| JP | 2005-199263 A | 7/2005 |
| WO | 00-05168 A1 | 2/2000 |
| WO | 01/10979 A1 | 2/2001 |
| WO | 03/057651 A1 | 7/2003 |
| WO | WO 2006/045744 A1 * | 5/2006 |
| WO | 2007/114274 A1 | 10/2007 |

OTHER PUBLICATIONS

Notification of Transmittal of Copies Translation of the International Preliminary Report on Patentability (Form PCT/IB/338) of International Application No. PCT/JP2008/067370 mailed May 14, 2010 with Forms PCT/IB/326, PCT/IB/373 and PCT/ISA/237.

Japanese Office Action dated Sep. 13, 2012, issued in corresponding Japanese Patent Application No. 2007-254856, with English translation (6 pages).

Extended European Search Report dated Jun. 21, 2012, issued in corresponding European Patent Application 08832974.3.

Translation of the International Preliminary Report on Patentability (Form PCT/IB/338) of International Application No. PCT/JP2008/067370 mailed May 14, 2010 with Forms PCT/IB/326, PCT/IB/373 and PCT/ISA/237.

* cited by examiner

METHOD FOR EFFICIENT USE OF HEAT FROM TUBULAR REFORMER

TECHNICAL FIELD

The present invention relates to a so-called gas-to-liquid (GTL) process for synthesizing hydrocarbon oil from natural gas. More specifically, the present invention enhances heat efficiency in the GTL process using a tubular reformer.

BACKGROUND ART

The future exhaustion of oil resources has been concerned for a long time. During this time, in order to decrease the dependence on the oil resources even in a small degree, there have been studied technologies of producing various kinds of hydrocarbon oils such as naphtha, kerosene, and gas oil, using other carbon sources such as natural gas, coal, or biomass as a feedstock. Under such circumstances, the GTL process is considered to have reached a practical stage as a technology to a certain extent, and the operation of a plant on a practical scale has already started in a region where natural gas is produced in abundance. Similar plants will be constructed further in the future.

The GTL process is performed as follows: natural gas containing methane ($CH_4$) as a main component is reformed, whereby a synthesis gas containing hydrogen ($H_2$) and carbon monoxide (CO) as main components is produced; Fischer-Tropsch synthesis (FT synthesis) is performed using the synthesis gas as a feedstock, whereby so-called Fischer-Tropsch oil (FT oil) that is a mixture of various kinds of hydrocarbon oils containing heavy hydrocarbon is produced; and the FT oil thus obtained is refined by upgrading, whereby various kinds of oil products such as naphtha, kerosene, and gas oil are produced. Thus, the GTL process roughly includes three sections: a synthesis gas production section (reforming section), a Fischer-Tropsch oil production section (FT section), and an upgrading section (UG section).

In the reforming section of the GTL process, conventionally, an autothermal reforming (ATR) process or a partial oxidation (POX) process has been used in most cases. A steam reforming process or a carbon dioxide reforming process in which steam or carbon dioxide is allowed to react with the natural gas directly can be conducted more simply in terms of the principle for converting the natural gas into the synthesis gas. However, those processes are not used so often because of the following reason.

According to the steam reforming process or carbon dioxide reforming process, steam or carbon dioxide is added to the natural gas, and the mixture is allowed to pass through a reaction tube filled with a reforming catalyst. Then, the reaction tube is placed in a radiation section of a tubular reformer and heated from outside, whereby the natural gas (methane) is converted into the synthesis gas in accordance with Reaction Formula (1) or (2).

$$CH_4+H_2O \rightarrow CO+3H_2 \quad (1)$$

$$CH_4+CO_2 \rightarrow 2CO+2H_2 \quad (2)$$

Here, it should be noted that the molar ratio between hydrogen and carbon monoxide in the synthesis gas to be obtained can be adjusted in a range of 3:1 to 1:1 by adjusting the ratio between the Reaction Formula (1) and the Reaction Formula (2). Both the reactions are endothermic reactions, and hence, it is necessary to feed a great amount of heat from outside. Therefore, there is a problem in that the heat efficiency is low, and a reaction apparatus is enlarged if those reactions are applied to a large-scale production.

In contrast, each of the ATR, the POX, and a catalytic partial oxidation (CPOX) process that has recently reached a practical stage can be called a partial oxidation process in a broad sense. According to those processes, oxygen (instead of steam or carbon dioxide) is added to the natural gas, and the natural gas is converted into the synthesis gas in accordance with Reaction formula (3) below.

$$CH_4+(½)O_2 \rightarrow CO+2H_2 \quad (3)$$

According to this reaction, in the case of the POX, the natural gas that is a feedstock is partially burnt with oxygen to generate hydrogen and carbon monoxide. This reaction is conducted without a catalyst, which requires high temperatures of 1,000° C. or more, for example, about 1,400° C. Therefore, it is necessary to add oxygen in an amount greater than a stoichiometric amount, and accordingly, the ratio between hydrogen and carbon monoxide to be generated becomes 2 or less. Therefore, the ratio of hydrogen and carbon monoxide may be adjusted to 2 by setting a small steam reformer in addition to the POX. In contrast, it is considered that the ATR includes a first stage of burning a part of the natural gas that is a feedstock by the addition of oxygen to generate water (steam) and carbon dioxide; and a second stage of allowing the generated steam and carbon dioxide to react with the remaining natural gas, thereby generating hydrogen and carbon monoxide. More specifically, it can be considered that this reaction itself generates and feeds steam and carbon dioxide used for a steam reforming process and a carbon dioxide reforming process. The first stage is a combustion reaction involving the large generation of heat, and the second stage is an endothermic reaction in accordance with Reaction Formula (1) or (2). Those stages are a heat generation reaction as a whole, and hence, it is not necessary to feed heat from outside, and there is an advantage in that the heat efficiency of the reforming section itself is high. Therefore, in the reforming section of the GTL process, those processes are often used.

The synthesis gas produced in the reforming section contains hydrogen and carbon monoxide as main components. In the FT section, FT oil is produced by FT synthesis in accordance with the following Reaction Formula (4), using the thus obtained synthesis gas containing hydrogen and carbon monoxide as a feedstock.

$$2nH_2+nCO \rightarrow -(CH_2)_n-+nH_2O \quad (4)$$

As is understood from Reaction Formula (4), stoichiometrically, it is preferable to feed hydrogen and carbon monoxide in a molar ratio of 2:1 in the FT synthesis. As described above, a synthesis gas containing this composition can also be obtained by using both the steam reforming reaction and the carbon dioxide reforming reaction. An intermediate product produced by the FT synthesis contains a gaseous product (containing unreacted hydrogen and carbon monoxide, or hydrocarbon with 4 or less carbon atoms, etc.). Therefore, in the FT section, the gaseous product is removed by separation after the FT synthesis to produce FT oil.

The FT oil obtained in the FT section contains heavy components. Therefore, in the UG section, various kinds of petroleum products such as naphtha, kerosene, and gas oil are produced by performing hydrotreatment, or hydrocracking and distillation (rectification). Typically, first, the FT oil is distilled to separate to heavy components and the other light components. Then, the heavy components are hydrotreated (including hydrocracking) to be light components, and the obtained light components are further separated by distillation. The FT oil introduced into a distillation column for the separation by distillation needs to be heated to a predetermined temperature (e.g., 300° C. to 350° C.) previously. Also, before the separated heavy components are introduced into a hydrogenation reactor for hydrotreatment, the heavy components need to be heated to a predetermined temperature (e.g., 300° C. to 400° C.). In the conventional GTL process, the separated heavy components are directly heated by a heating furnace or are indirectly heated by providing a heat exchanger for heating separately from the heating furnace and circulating hot oil between the heating furnace and a heat exchanger for heating.

In the ATR and the POX currently used in the reforming section of the GTL process, it is necessary to feed excess steam so as to keep the life of a burner, which causes a problem in that it is difficult to operate the process under economically optimum conditions. There also is a problem in the POX in that the controllability of the reaction is difficult, and a great amount of soot is likely to be generated. The CPOX that does not use burner combustion has been developed so as to solve the above problems. However, the CPOX has a problem in that heat generation is concentrated in the vicinity of the inlet of a catalyst layer and hot spots are likely to be generated. The reason for this is as follows: the combustion reaction in the first stage involving the large generation of heat precedes in the vicinity of the inlet of the catalyst layer; and a reforming reaction in the second stage involving the absorption of heat occurs toward a downstream portion. It was found that this problem could be solved by allowing the heat generation reaction in the first stage and the endothermic reaction in the second stage to proceed simultaneously in parallel, or allowing a partial oxidation reaction in accordance with Reaction Formula (3) to be directly effected. A catalyst and an apparatus therefor have been developed recently (JP 2005-193110 A, JP 2005-199263 A).

DISCLOSURE OF THE INVENTION

However, the above-mentioned CPOX process requires the use of special apparatus and catalyst, and requires a high technology and a special know-how for the operation management. The partial oxidation process in a broad sense such as the ATR, the POX, and the CPOX inherently requires the separate setting of an oxygen plant because oxygen is added to natural gas. However, there is a problem in that the oxygen plant is very expensive, and an advantage of scale cannot be brought unless the oxygen plant is enlarged. In general, it is considered that the ATR and the POX become advantageous in the case of about 15,000 BPSD or more in the GTL (corresponding to one train). In addition, the addition of oxygen to natural gas inherently involves the danger of explosion, and requires a high technology and minute care for the apparatus design and operation management.

In contrast, according to the steam reforming process and the carbon dioxide reforming process, indirect heating is performed using a tubular reformer, and the reaction itself is an endothermic reaction. Therefore, there is the advantage in that the danger of uncontrolled excursion is inherently low, and such a high technology and know-how as those in the ATR and the CPOX are not required for the apparatus design and operation management. Thus, although the advantage of using the steam reforming process and the carbon dioxide reforming process using the tubular reformer in the reforming section of the GTL process is high, the improvement of heat efficiency, which is an obstacle for adopting those processes, becomes a serious problem.

The present invention provides a method of producing various kinds of hydrocarbon oils from natural gas, including: producing a synthesis gas containing hydrogen and carbon monoxide as main components by reacting the natural gas containing methane as a main component with at least one of steam and carbon dioxide through a tubular reformer filled with a reforming catalyst; producing Fischer-Tropsch oil by subjecting the produced synthesis gas to a Fischer-Tropsch reaction, and separating a gaseous product from the reaction product; and upgrading in which the produced Fischer-Tropsch oil is subjected to hydrotreatment and distillation to produce various kinds of hydrocarbon oils, in which excess heat generated in the producing the synthesis gas is recovered, and the recovered heat is used as heat for at least one of hydrotreatment and distillation in the upgrading, whereby the above-mentioned problem is solved.

It is preferred that the excess heat generated in the synthesis gas production section is recovered with a coil for heat recovery set in a convection section of a tubular reformer. A GTL process adopting the tubular reformer in the reforming section has not existed so far. However, if the excess heat generated in the convection section of the tubular reformer can be used in the upgrading section, it is not necessary to provide a furnace separately in the upgrading section, and it is expected that the heat efficiency in the entire process is enhanced.

It is preferred that the Fischer-Tropsch oil produced in the Fischer-Tropsch oil production section is directly passed through a coil in the convection section of the tubular reformer, so that hot oil need not be circulated between the heat exchanger separately provided and the convection section of the tubular reformer.

It is preferred to recover the excess heat generated in the synthesis gas production section by 10% or more, because the heat required in the upgrading section cannot be obtained sufficiently if the heat recovery ratio is lower than the above.

According to the present invention, the excess heat generated in the section of producing synthesis gas is recovered and used as the heat required in the upgrading section, whereby the heat efficiency of the entire GTL process can be enhanced.

BEST MODE FOR CARRYING OUT THE INVENTION

Hereinafter, the embodiments of the present invention are described specifically. It should be noted that the present invention is not limited to the following embodiments.

Embodiment 1

Figure 1:
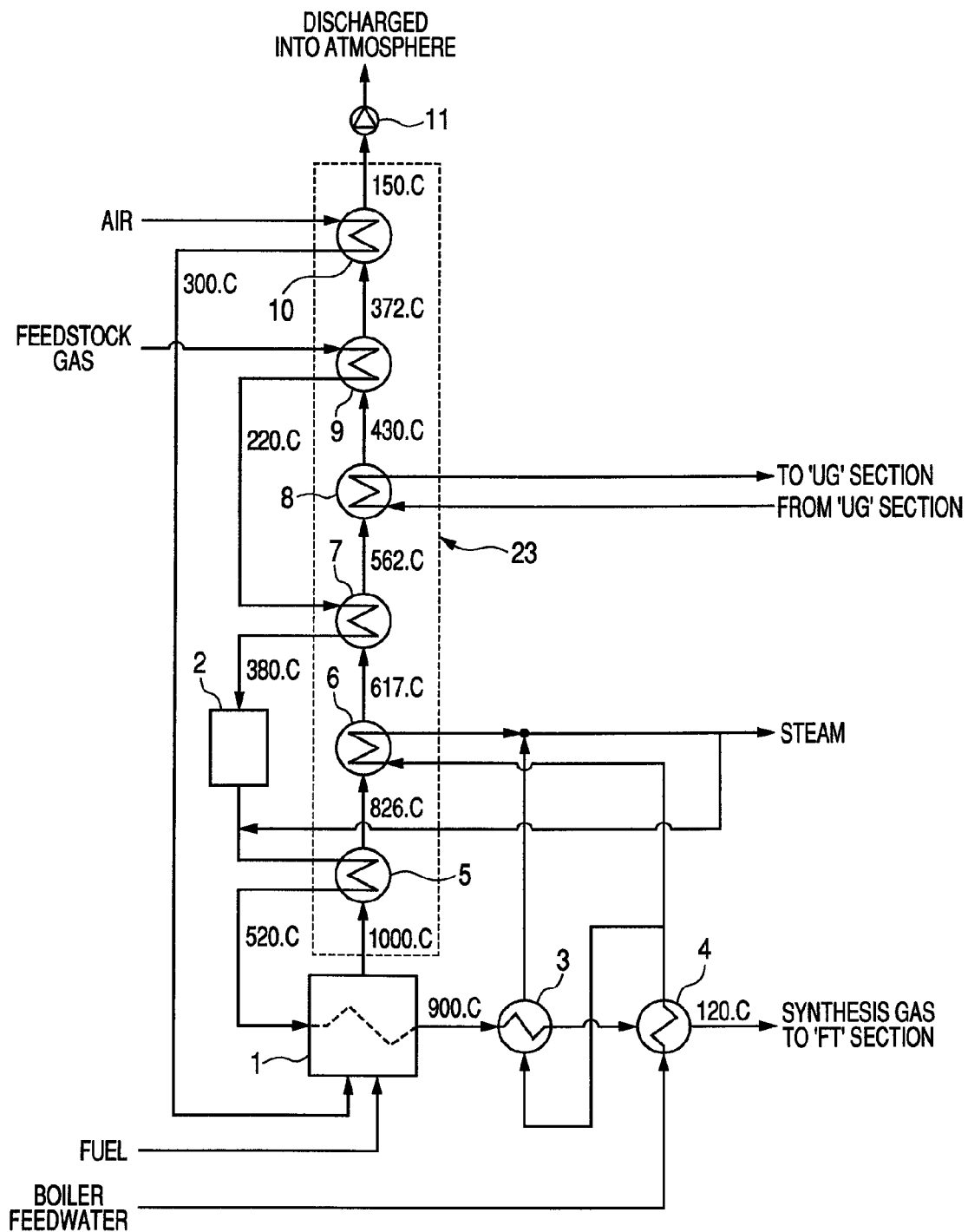
FIG. 1 illustrates a process flow of the synthesis gas production section in Embodiment 1 of the GTL process according to the present invention.

FIG. 1 illustrates a process flow of the synthesis gas production section (reforming section) in Embodiment 1 of the GTL process according to the present invention. FIG. 1 illustrates only a main flow related to the recovery of excess heat generated in the reforming section without illustrating the entire process flow of the reforming section. Thus, it should be noted that, for example, a flow of adding carbon dioxide to feedstock natural gas, a flow of separating an unreacted gas from a tubular reformer outlet gas, and the like are not shown.

In FIG. 1, a number of reaction tubes filled with a reforming catalyst are placed in a radiation section of a tubular reformer 1. As the reforming catalyst, an oxide carrier carrying catalyst metal such as VIII-group metal is used. The radiation section of the tubular reformer 1 is fed with fuel (generally, natural gas) and air to effect burner combustion, whereby a group of the reaction tubes placed in the radiation section of the tubular reformer 1 are heated from the outside. The combustion exhaust gas after being used for heating the group of the reaction tubes passes through a convection section in which a first coil 5 to a sixth coil 10 are placed, is used for preheating feedstock natural gas and generating process steam, and is finally discharged into the atmosphere by an ID fan 11.

On the other hand, natural gas to be a feedstock is preheated by a fifth coil 9 and a third coil 7, and subjected to desulfurization in a hydrodesulfurizer 2. Then, a predetermined amount of steam (and carbon dioxide not shown) is added to the resultant natural gas. After that, the natural gas is further heated by the first coil 5 and flown into a group of reaction tubes in the radiation section of the tubular reformer 1 at about 520° C. The group of reaction tubes is heated at about 1,000° C. in the radiation section of the tubular reformer 1, whereby the feedstock gas passing through the tube is converted into a synthesis gas containing hydrogen and carbon monoxide in the presence of a reforming catalyst. The process outlet gas (containing the synthesis gas) from the group of reaction tubes passes through a waste-heat boiler 3 and a feedwater heater 4 to be cooled. Unreacted steam and carbon dioxide are removed by separation in a condenser or a carbon dioxide absorbing column, both of which are not illustrated, and thereafter, sent to the section of producing Fischer-Tropsch oil (FT section).

Figure 2:
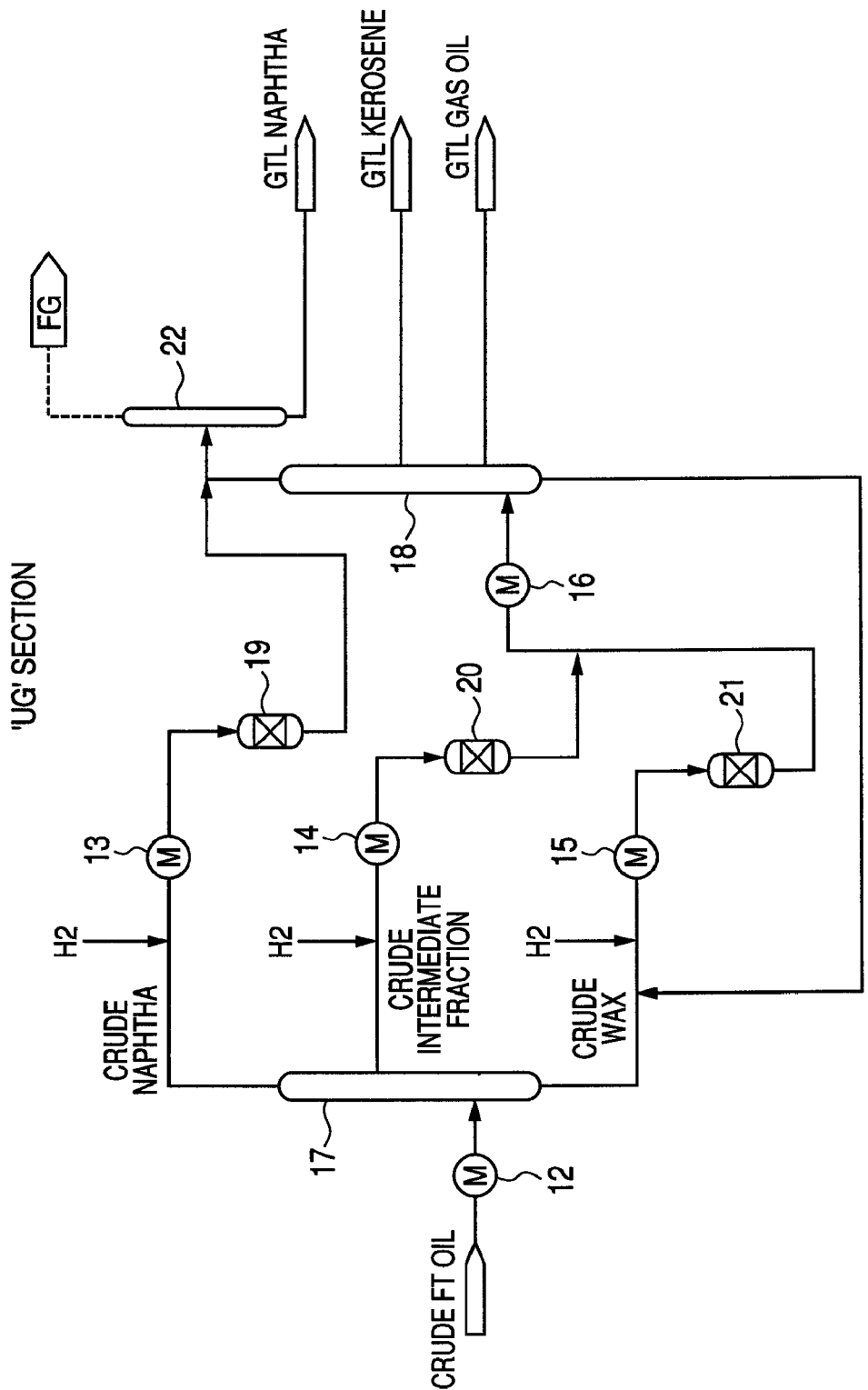
FIG. 2 illustrates an example of a process flow of the upgrading section.

The crude FT oil produced in the FT section is fed to the upgrading section (UG section) illustrated in FIG. 2 and heated to about 300° C. to 350° C. by a heat exchanger 12, and thereafter, introduced to a first distillation column 17. Crude naphtha, a crude intermediate fraction, and crude wax separated in the first distillation column are respectively heated to predetermined temperatures in heat exchangers 13, 14, and 15, and fed to a naphtha hydrotreating apparatus 19, an intermediate fraction hydrotreating apparatus 20, and a wax hydrocracking apparatus 21, whereby the crude naphtha, the crude intermediate fraction, and the crude wax are subjected to hydrotreatment or hydrocracking. Treated oil from the intermediate fraction hydrotreating apparatus 20 and the wax hydrocracking apparatus 21 is joined with each other and heated to a predetermined temperature by the heat exchanger 16, and then introduced into a second distillation column. In the second distillation column, naphtha is taken out from a top portion, joined with a naphtha component hydrotreated in the naphtha hydrotreating apparatus 19, and formed into a product as GTL naphtha through a stabilizer 22. Further, GTL kerosene is taken out from a central portion of the second distillation column, and GTL gas oil is taken out from a lower portion thereof, and the both are formed into products. A wax component taken out from a bottom portion of the second distillation column is joined with the crude wax component taken out from the bottom portion of the first distillation column, recycled, and hydrotreated again.

Excess heat in the reforming section is recovered as follows. First, a process gas from an outlet of the group of reaction tubes (tubular reformer) has a high temperature of about 900° C., and the heat thereof is used for generating steam and preheating feedwater therefor in the waste-heat boiler 3 and the feedwater heater 4. On the other hand, the combustion exhaust gas discharged from the radiation section of the tubular reformer has a high temperature of about 1,000° C., and the heat thereof is used for preheating feedstock natural gas in the first coil 5 to the sixth coil 10 placed in the convection section and generating process steam. What is characteristic is that the heat recovered at a site corresponding to the fourth coil 8 is used in the UG section. More specifically, the Fischer-Tropsch oil (FT oil) produced in the section of producing Fischer-Tropsch oil (FT section) is heated with the combustion exhaust gas from the radiation section of the tubular reformer 1 by the heat exchangers 12, 13, 14, 15, and 16 each placed as a coil at a site corresponding to the fourth coil 8 of the convection section of the tubular reformer 23. The FT oil thus heated is subjected to separation by distillation and hydrotreatment in the UG section. Alternatively, hot oil may be heated in the fourth coil 8, and the heated hot oil may heat the FT oil in the heat exchangers 12, 13, 14, 15, and 16 provided in the UG section.

In Embodiment 1, all the heat required for separation by distillation and hydrotreatment in the UG section is covered by the heat recovered at the site corresponding to the fourth coil 8. Thus, it should be noted that the recovery amount of heat in the fourth coil is larger than that in Embodiment 2 in which only heat required for separation by distillation is covered.

Embodiment 2

Figure 3:
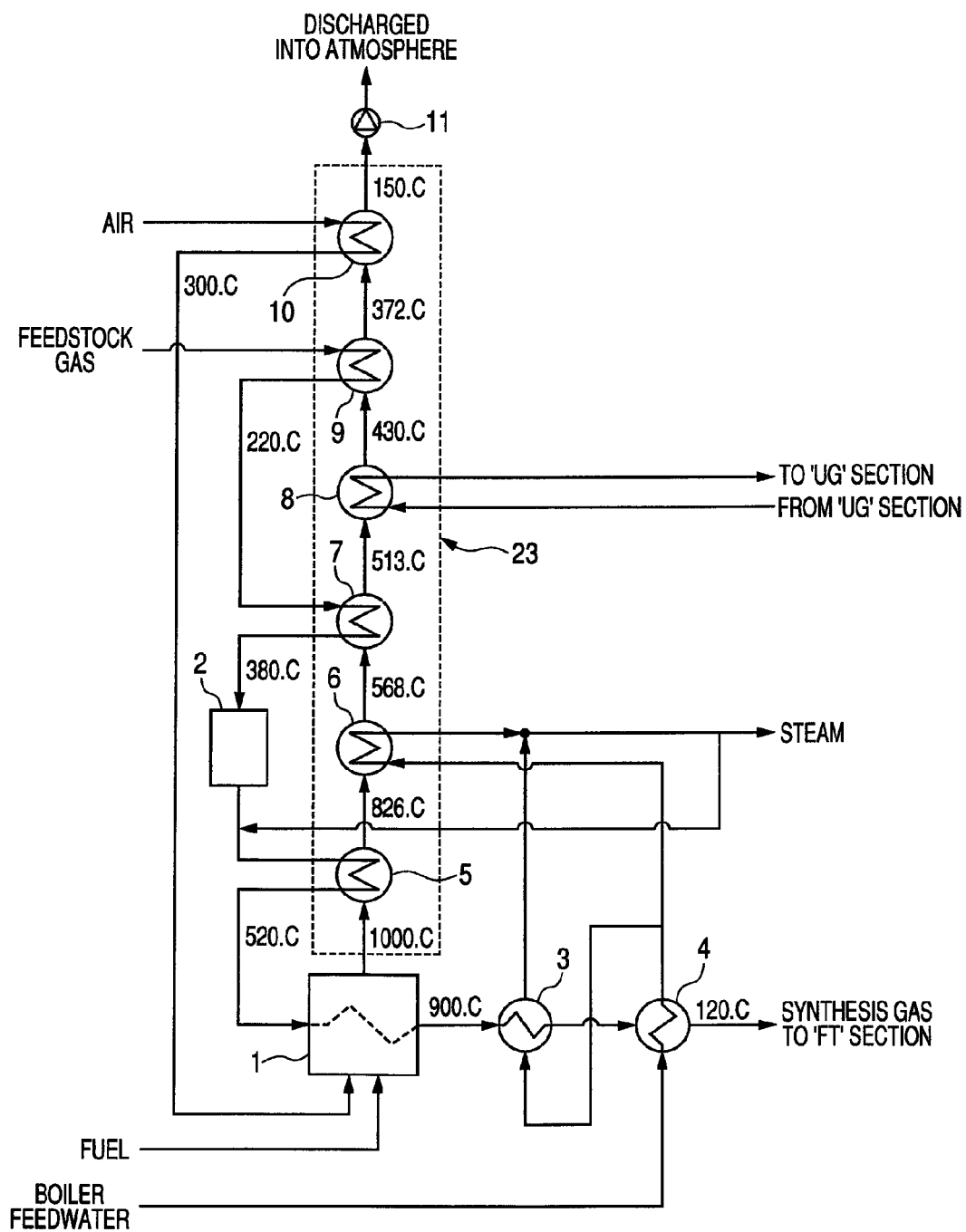
FIG. 3 illustrates a process flow of the synthesis gas production section in Embodiment 2 of the GTL process according to the present invention.

FIG. 3 illustrates a process flow of the synthesis gas production section (reforming section) in Embodiment 2 of the GTL process according to the present invention. In Embodiment 2, only the heat required for distillation in the UG section is covered by the heat recovered in the fourth coil 8. Embodiment 2 is the same as Embodiment 1 except for the above. The reason why the heat recovered in the fourth coil 8 is not used for hydrotreatment in Embodiment 2 is that the heat required in hydrotreatment can be substantially covered by heat exchange between an inflow side flow and an outflow side flow of the hydrogenation reactor during a steady operation. More specifically, Embodiment 2 assumes such a steady operation. Therefore, Embodiment 1 may be carried out at the start-up and may be switched to Embodiment 2 when the operation becomes steady. In Embodiment 2, as described above, the recovery amount of heat in the fourth coil is smaller than that in Embodiment 1.

Comparative Embodiment

Figure 4:
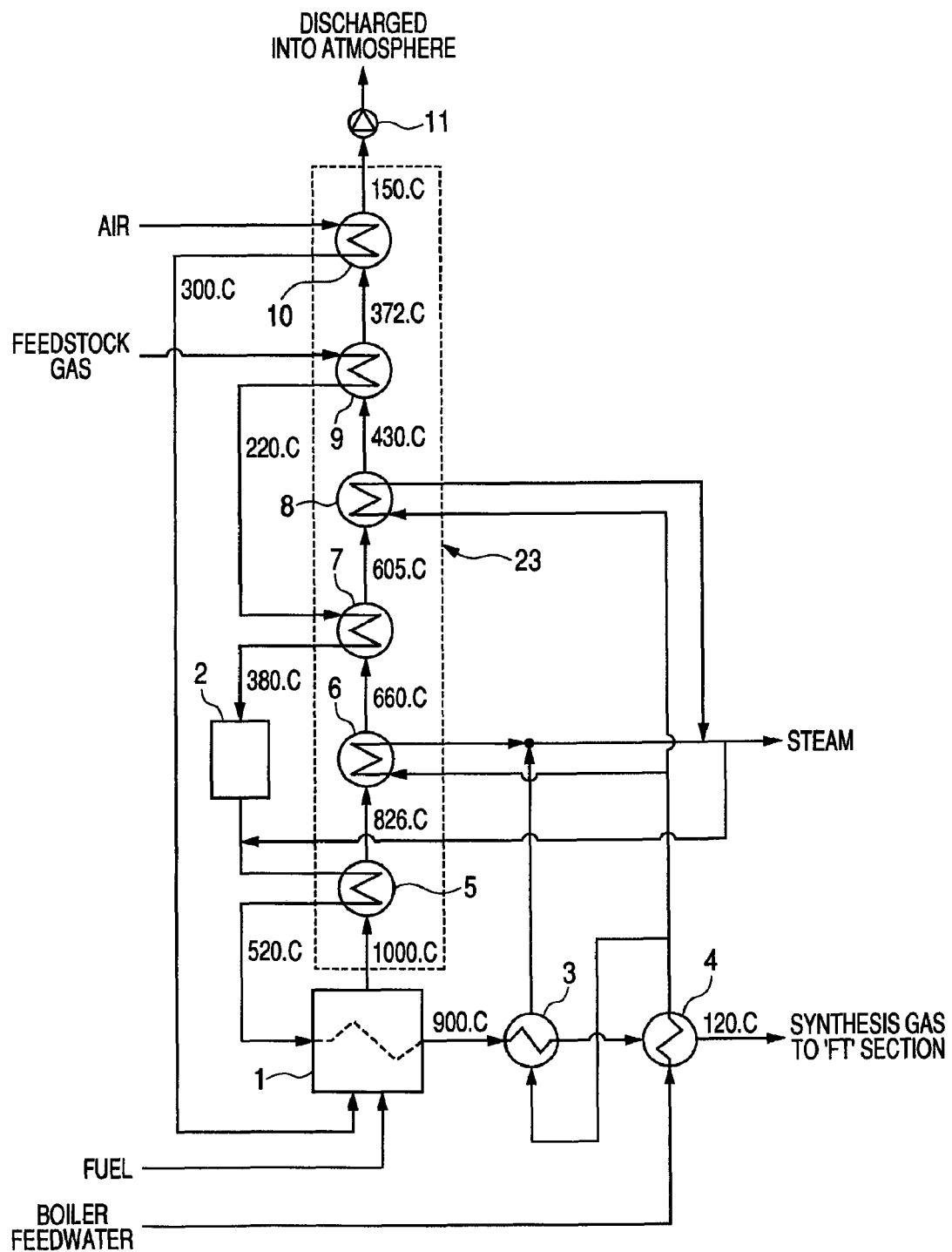
FIG. 4 illustrates a process flow of the synthesis gas production section in a comparative embodiment.

FIG. 4 illustrates a process flow in the synthesis gas production section (reforming section) in Comparative Embodiment. In Comparative Embodiment, excess heat recovered in the reforming section is not used in the UG section. More specifically, the heat recovered in the fourth coil 8 is used for generating steam instead of being used in the UG section. Thus, the generation amount of steam in Comparative Embodiment is larger than those in Embodiments 1 and 2. However, the generation amount of steam sufficiently covers the required amount of process steam even in Embodiments 1 and 2, and hence, it can be considered that steam in an amount more than necessary is generated in Comparative Embodiment. Comparative Embodiment is the same as Embodiments 1 and 2 except for the above.

(Comparison of Heat Efficiency)

Table 1 illustrates a heat recovery schedule in Embodiments 1 and 2 and Comparative Embodiment. Table 1 summarizes a heat recovery load ratio in each of the first to sixth coils (ratio of the heat recovery load in each coil with respect to the heat recovery load in all the first to sixth coils), the decrease in temperature of combustion exhaust gas, a heat recovery load ratio in the waste-heat boiler and feedwater heater (relative value with respect to the heat recovery load ratio of the convection section), and the decrease in temperature of process gas, with respect to Embodiments 1 and 2 and Comparative Embodiment.

The difference of the heat recovery schedule between Embodiments 1 and 2, and Comparative Embodiment lies in the heat recovery load ratio (and the decrease in temperature of combustion exhaust gas) in the second and fourth coils, and Embodiments 1 and 2, and Comparative Embodiment are the same in the other conditions. More specifically, the total heat recovery load ratio of the second and fourth coils is the same, i.e., 40.7% (in Embodiment 1 and Comparative Embodiment, fractions are rounded up, and hence, the heat recovery load ratio is 40.8% in the apparent calculation) in any embodiments. The heat recovery load is distributed to Second coil: Fourth coil=25.5:15.3 in Embodiment 1, Second coil:Fourth coil=31.2:9.5 in Embodiment 2, and Second coil:Fourth coil=20.4:20.4 in Comparative Embodiment. More specifically, the heat recovery load ratio corresponding to that used in the UG section is the highest, i.e., 15.3% in Embodiment 1, 9.5% in Embodiment 2, and 0% in Comparative Embodiment since no heat is used in the UG section.

The heat recovery load ratio corresponding to the amount used for generating steam is the lowest, i.e., 25.5% in Embodiment 1, 31.2% in Embodiment 2, and the highest, i.e., 40.7% in Comparative Embodiment. However, the required amount of process steam is 0.346 (kg/Nm$^3$—H$_2$+CO) by a weight per total gas amount of hydrogen and carbon monoxide in reformer outlet gas, whereas excess steam is generated as follows: 0.736 kg/Nm$^3$—H$_2$+CO in Embodiment 1, 0.791 kg/Nm$^3$—H$_2$+CO in Embodiment 2, and 0.882 kg/Nm$^3$—H$_2$+CO in Comparative Embodiment. Thus, it is understood that the increased amount of the generated amount of steam is entirely used for generating excess steam. Herein, if the generated amount of excess steam of 0.882 kg/Nm$^3$—H$_2$+CO in Comparative Embodiment (the case where excess heat is not used in the UG section) is taken as a standard, the decreased amount of the generated amount of excess steam in Embodiments 1 and 2 with respect to the standard corresponds to the amount used in the UG section in each embodiment, i.e., the use ratio of excess heat. Therefore, the use ratio of excess heat in Embodiment 1 is [(0.882−0.736)/0.882]×100=16.6%, and the use ratio of excess heat in Embodiment 2 is [(0.882−0.791)/0.882]×100=10.4%, and the heat efficiency in the entire GTL process is enhanced accordingly.

This application claims the benefit of Japanese Patent Application No. 2007-254856, filed Sep. 28, 2007, which is hereby incorporated by reference herein in its entirety.

TABLE 1

| | | Comparative Embodiment | | Embodiment 1 | | Embodiment 2 | |
|---|---|---|---|---|---|---|---|
| | Convection section | Exhaust gas temperature (° c.) | Heat recovery load ratio | Exhaust gas temperature (° c.) | Heat recovery load ratio | Exhaust gas temperature (° C.) | Heat recovery load ratio |
| (1) Coil 1 | Feedstock gas heating | 1,000 ↓ 826 | 22.0 | 1,000 ↓ 826 | 22.0 | 1,000 ↓ 826 | 22.0 |
| (2) Coil 2 | Steam generation | ↓ 660 | 20.4 | ↓ 617 | 25.5 | ↓ 568 | 31.2 |
| (3) Coil 3 | Feedstock gas heating | ↓ 605 | 6.5 | ↓ 562 | 6.5 | ↓ 513 | 6.5 |
| (4) Coil 4 | Steam generation or use in UG section | ↓ 430 | 20.4 | ↓ 430 | 15.3 | ↓ 430 | 9.5 |
| (5) Coil 5 | Feedstock gas heating | ↓ 372 | 6.6 | ↓ 372 | 6.6 | ↓ 372 | 6.6 |
| (6) Coil 6 | Air preheating | ↓ 150 | 24.2 | ↓ 150 | 24.2 | ↓ 150 | 24.2 |
| Convection section meter | | | 100.0 | | 100.0 | | 100.0 |
| Process gas: tubular reformer outlet | | Process gas temperature (° c.) | Heat recovery load ratio | process gas temperature (° c.) | Heat recovery load ratio | Process gas temperature (° C.) | Heat recovery load ratio |
| (7) Waste-heat boiler | | 900 ↓ 270 | 64.3 | 900 ↓ 270 | 64.3 | 900 ↓ 270 | 64.3 |
| (8) Feedwater heater | | ↓ 120 | 23.0 | ↓ 120 | 23.0 | ↓ 120 | 23.0 |
| Recovery heat use ratio in UG section | | | 0.0 | | 15.3 | | 9.5 |
| Process steam (kg/Mm$^3$—H$_2$ + CO) (*) | | | 0.346 | | 0.346 | | 0.346 |
| Excess steam (kg/Nm$^3$—H2 + CO) (*) | | | 0.882 | | 0.736 | | 0.791 |

(*) WEIGHT PER H$_2$ + CO GAS AMOUNT IN TUBULAR REFORMER OUTLET GAS

The invention claimed is:

1. A method of producing hydrocarbon oils from natural gas containing methane as a main component, comprising steps of:
   producing a synthesis gas containing hydrogen and carbon monoxide as main components by reacting the natural gas with at least one of steam and carbon dioxide in a tubular reformer filled with a reforming catalyst;
   producing Fischer-Tropsch oil by subjecting the produced synthesis gas to a Fischer-Tropsch reaction to form a reaction product, and separating a gaseous product from the reaction product; and
   upgrading the produced Fischer-Tropsch oil by subjecting it to hydrotreatment and distillation to produce the hydrocarbon oils, wherein the produced Fischer-Tropsch oil is allowed to pass through a coil in a convection section of the tubular reformer to recover excess heat generated in the synthesis gas producing step and use it as heat for at least one of hydrotreatment and distillation in the upgrading step.

2. A method according to claim 1, wherein 10% or more of the excess heat generated in the synthesis gas producing step is recovered as the heat for the at least one of hydrotreatment and distillation in the upgrading step.

* * * * *